United States Patent
Kim et al.

(10) Patent No.: US 7,821,977 B2
(45) Date of Patent: Oct. 26, 2010

(54) DETERMINING DATA AMOUNTS FOR SCHEDULED AND AUTONOMOUS TRANSMISSION WITH A USER EQUIPMENT

(75) Inventors: Young-Bum Kim, Seoul (KR); Ju-Ho Lee, Suwon-si (KR); Kook-Heui Lee, Yongin-si (KR); Van Lieshout Gert Jan, Staines (GB); Joon-Young Cho, Suwon-si (KR); Yong-Jun Kwak, Yongin-si (KR); Youn-Hyoung Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1124 days.

(21) Appl. No.: 11/327,653

(22) Filed: Jan. 9, 2006

(65) Prior Publication Data

US 2006/0209869 A1  Sep. 21, 2006

(30) Foreign Application Priority Data

Jan. 10, 2005 (KR) .................... 10-2005-0002365

(51) Int. Cl.
   *G08C 17/00* (2006.01)
   *H04W 4/00* (2009.01)
(52) U.S. Cl. ...................... 370/311; 370/338
(58) Field of Classification Search .................. 370/236, 370/395.4, 311, 338, 350, 329, 352, 389
See application file for complete search history.

(56) References Cited

U.S. PATENT DOCUMENTS

| 2002/0168994 | A1   | 11/2002 | Terry et al. |
| 2004/0160959 | A1 * | 8/2004  | Balachandran et al. ... 370/395.4 |
| 2005/0030953 | A1 * | 2/2005  | Vasudevan et al. ....... 370/395.4 |

FOREIGN PATENT DOCUMENTS

JP   08280064   10/1996

* cited by examiner

*Primary Examiner*—George Eng
*Assistant Examiner*—Michael Faragalla
(74) *Attorney, Agent, or Firm*—Roylance, Abrams, Berdo & Goodman, L.L.P.

(57) ABSTRACT

A method includes (1) receiving with a user equipment (UE) information related to an allowed power for autonomous transmission on at least one logical channel mapped to an uplink channel, the uplink channel being set up with a base station and dedicated for packet data transmission, (2) determining, with the UE and in accordance with a scheduling grant received from the base station, an allowed power of scheduled transmission on the uplink channel, (3) determining a total data amount allowed to be transmitted, (4) determining a data amount for the autonomous transmission on the logical channel, the determined autonomous transmission data amount being not greater than an allowed autonomous transmission data amount corresponding to the allowed autonomous transmission power, and (5) determining a data amount for scheduled transmission on the logical channel, the determined scheduled transmission data amount being not greater than an allowed scheduled transmission data amount corresponding to the allowed scheduled transmission power.

16 Claims, 5 Drawing Sheets

DETERMINING DATA AMOUNTS FOR SCHEDULED AND AUTONOMOUS TRANSMISSION WITH A USER EQUIPMENT

PRIORITY

This application claims the benefit under 35 U.S.C. §119(a) of a Korean Patent application filed in the Korean Intellectual Property Office on Jan. 10, 2005 and assigned Serial No. 2005-2365, the entire contents of which are hereby incorporated by reference.

BACKGROUND OF THE INVENTION

1. Field of the Invention

The present invention relates generally to determining data amounts for scheduled and autonomous transmission with a user equipment.

2. Description of the Related Art

A $3^{rd}$ generation mobile communication system using Wideband CDMA (WCDMA) based on the European Global System for Mobile communications (GSM) system and General Packet Radio Services (GPRS), Universal Mobile Telecommunication Service (UMTS) provides mobile subscribers or computer users with a uniform service of transmitting packet-based text, digitized voice, and video and multimedia data at or above 2 Mbps irrespective of their locations around the world.

Particularly the UMTS system uses a transport channel called the E-DCH in order to further improve the packet transmission performance of uplink communications from a UE to a Node B (interchangeable with a base station). For more stable high-speed data transmission, Adaptive Modulation and Coding (AMC), Hybrid Automatic Repeat reQuest (HARQ), Node B-controlled scheduling, and shorter Transmission Time Interval (TTI) were introduced for the E-DCH transmission.

AMC is a technique of determining a Modulation and Coding Scheme (MCS) adaptively according to the channel status between the Node B and the UE. Many MCS levels can be defined according to available modulation schemes and coding schemes. The adaptive selection of a MCS level according to the channel status raises efficiency of resource usage.

HARQ is a packet retransmission scheme for retransmitting a packet to correct errors in an initially transmitted packet. HARQ is branched into Chase Combining (CC) and Incremental Redundancy (IR).

Node B-controlled scheduling is a scheme in which the Node B determines whether to permit E-DCH transmission for the UE and if it does, and an allowed maximum data rate, and transmits the determined data rate information as a scheduling grant to the UE, and the UE determines an available E-DCH data rate based on the scheduling grant.

Shorter TTI is a technique for reducing retransmission time delay and thus increasing system throughput by allowing the use of a shorter TTI than the shortest TTI of 10 ms for a conventional Dedicated CHannel (DCH).

FIG. 1 illustrates uplink packet transmission on the E-DCH in a conventional mobile communication system. While the E-DCH and CDMA communication systems are discussed in detail along with its problems, similar problems may also arise in other communication systems including but not limited to OFDMA and TDMA systems, and the present invention may be applied in any one of those communication systems.

Referring to FIG. 1, reference numeral 100 denotes a Node B supporting the E-DCH and reference numerals 101 to 104 denote UEs using the E-DCH. As illustrated, the UEs 101 to 104 transmit data to the Node B 100 on E-DCHs 111 to 114.

The Node B 100 notifies the individual UEs 101 to 104 whether they are permitted for E-DCH transmission or transmits to the UEs scheduling grants indicating E-DCH data rates for them, based on information about buffer occupancy and requested data rates or channel status information received from the UEs. The scheduling is performed such that the Rise over Thermal (RoT) measurement of the Node B does not exceed a target RoT to increase total system performance by, for example, allocating low data rates to remote UEs (e.g. the UEs 103 and 104) and high data rates to nearby UEs (e.g. the UEs 101 and 102).

FIG. 2 is a diagram illustrating a conventional signal flow for message transmission and reception on the E-DCH in an exemplary embodiment of the present invention.

Referring to FIG. 2, a Node B 200 and a UE 201 establish an E-DCH in step 202. Step 202 involves message transmission on dedicated transport channels. The UE 201 transmits scheduling information to the Node B 200 in step 204. The scheduling information may contain uplink channel status information being the transmit power and power margin of the UE, and the amount of buffered data to be transmitted to the Node B 200.

In step 206, the Node B 200 monitors scheduling information from a plurality of UEs to schedule uplink data transmissions for the individual UEs. The Node B 200 decides to approve an uplink packet transmission from the UE 201 and transmits scheduling assignment information to the UE 200 in step 208. The scheduling assignment information can be an Absolute Grant (AG) indicating an allowed maximum data rate and an allowed transmission timing, or a Relative Grant (RG) indicating up/hold/down in an allowed maximum data rate.

In step 210, the UE 201 determines the Transport Format (TF) of the E-DCH based on the scheduling assignment information. The UE 201 then transmits to the Node B 200 the TF information and uplink packet data on the E-DCH at the same time in steps 212 and 214. The UE 201 selects an MCS level according to an allowed maximum data rate set by the Node B 200 and its channel status, and transmits the E-DCH data using the MCS level in step 214.

The Node B 200 determines whether the TF information and the uplink packet data have errors in step 216. In the presence of errors in either of the TF information and the uplink packet data, the Node B 200 transmits a Negative ACKnowledgement (NACK) signal to the UE 201 on an ACK/NACK channel, whereas in the absence of errors in both, the Node B 200 transmits an ACK signal to the UE 201 on the ACK/NACK channel in step 218. In the latter case, the packet data transmission is completed and the UE 201 transmits new packet data to the Node B 200 on the E-DCH. On the other hand, in the former case, the UE 201 retransmits the same packet data to the Node B 200 on the E-DCH.

Under the above-described environment, if the Node B can receive from the UE scheduling information including information about the buffer occupancy and power status of the UE, it allocates a low data rate to the UE if it is far from the Node B, is in a bad channel status, or has data of a lower service class. If the UE is near to the Node B, is in a good channel status, or has data of a higher service class, the Node B allocates a high data rate to the UE. Therefore, the total system performance is increased.

Aside from the Node B-controlled scheduling, autonomous transmission or non-scheduled transmission is also supported for the E-DCH. The autonomous transmission obviates the need for transmitting scheduling information to the Node B and receiving scheduling assignment information from the Node B in the UE. Therefore, rapid E-DCH transmission is possible. While the E-DCH and CDMA communication systems were discussed above along with its problems, similar problems may also arise in other communication systems including but not limited to OFDMA and TDMA systems, and the present invention may be applied in any one of those communication systems.

SUMMARY OF THE INVENTION

According to an exemplary embodiment of the present invention, if available data rates for autonomous transmission are limited to or below a predetermined low range, involved time delay in scheduling can be reduced while achieving the improvement of system performance from the Node-B controlled scheduling. For this purpose, an exemplary embodiment of the present invention efficiently selects a Transport Format Combination (TFC) for E-DCH autonomous transmission.

According to an exemplary embodiment of the present invention, a method for determining data amounts for scheduled and autonomous transmission is provided. The method comprises (1) receiving with a user equipment (UE) information related to an allowed power for autonomous transmission on at least one logical channel mapped to an uplink channel, the uplink channel being set up with a base station and dedicated for packet data transmission, (2) determining, with the UE and in accordance with a scheduling grant received from the base station, an allowed power of scheduled transmission on the uplink channel, (3) determining, according to a total power available for the uplink channel, a total data amount allowed to be transmitted, (4) determining a data amount for the autonomous transmission on the logical channel, the determined autonomous transmission data amount being not greater than an allowed autonomous transmission data amount corresponding to the allowed autonomous transmission power, and (5) determining a data amount for scheduled transmission on the logical channel, the determined scheduled transmission data amount being not greater than an allowed scheduled transmission data amount corresponding to the allowed scheduled transmission power.

According to one aspect of the present invention, a method for transmitting data is provided in a mobile communication system supporting an enhanced uplink dedicated channel (E-DCH) in which both an autonomous transmission mode and a scheduled transmission mode are used. The method comprises transmitting information about the amount of data to be transmitted or transmit power equivalent to the data amount to a Node B by a user equipment (UE), receiving from the Node B a scheduling grant related to transmit power for a scheduled transmission mode by the UE, determining transmit power for autonomous transmission within an allowed transmit power range and then determining transmit power for scheduled transmission according to the scheduling grant by the UE, and transmitting to the Node B data with the determined transmit power in the autonomous transmission mode or the scheduled transmission mode by the UE, wherein if the transmit power determined for scheduled transmission exceeds the allowed transmit power range, transmit power is set for the scheduled transmission within the allowed transmit power range.

According to one aspect of the present invention, an apparatus for transmitting data is provided in a mobile communication system for supporting an enhanced uplink dedicated channel (E-DCH) in which both an autonomous transmission mode and a scheduled transmission mode are used. The apparatus comprises at least one of a plurality of transmission buffers for transmitting information about the amount of data to be transmitted from a user equipment (UE) or transmit power equivalent to the data amount to a Node B and a medium access control (MAC)-e protocol data unit (PDU) composer for receiving from the Node B a scheduling grant related to transmit power for a scheduled transmission mode of the UE, determining transmit power for autonomous transmission within an allowed transmit power range and then determining transmit power for scheduled transmission according to the scheduling grant by the UE, and transmitting to the Node B data with the determined transmit power in the autonomous transmission mode or the scheduled transmission mode, wherein if the transmit power determined for scheduled transmission exceeds the allowed transmit power range, the MAC-e PDU composer sets transmit power for the scheduled transmission within the allowed transmit power range.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF THE PREFERRED EMBODIMENTS

Preferred embodiments of the present invention will be described herein below with reference to the accompanying drawings. In the following description, well-known functions or constructions are omitted for clarity and conciseness.

The following description is made in the context of an E-DCH in a UMTS communication system. "Data rate" and "transmit power" are in a one-to-one correspondence and thus they are interchangeably used herein unless otherwise specified. While the E-DCH and CDMA communication systems are discussed in detail, the present invention is also applicable to any other communication systems including but not limited to OFDMA and TDMA systems.

Figure 1:
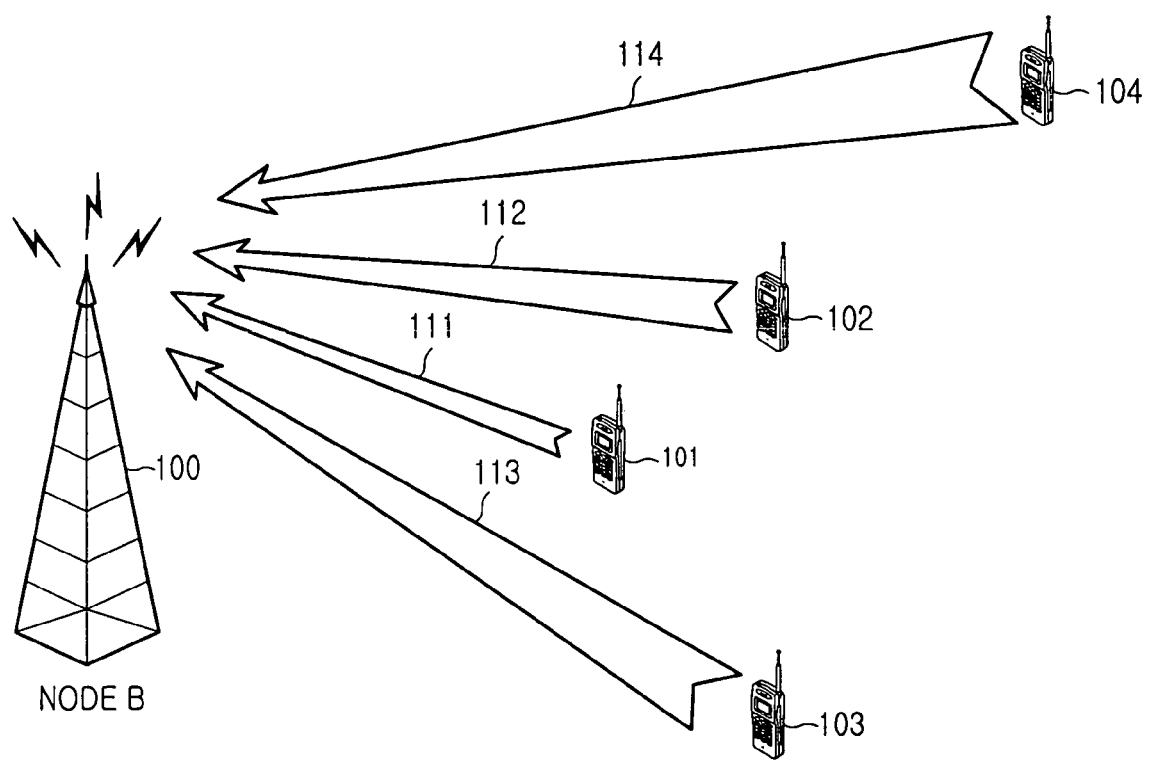
FIG. 1 illustrates uplink packet transmission on an E-DCH in a conventional mobile communication system.
Figure 2:
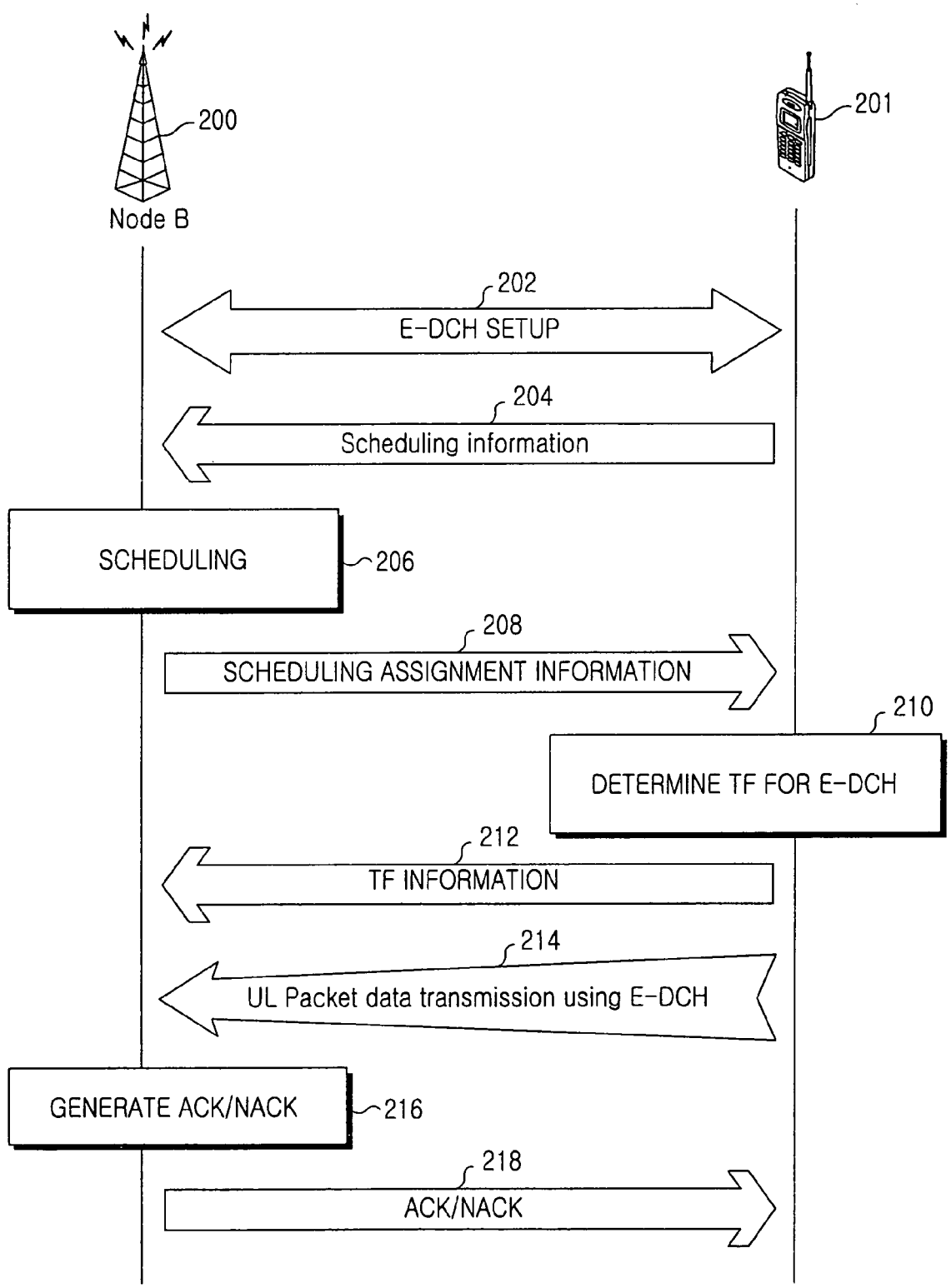
FIG. 2 is a diagram illustrating a conventional signal flow for message transmission and reception on the E-DCH according to an exemplary embodiment of the present invention.

Referring to FIG. 2 illustrating the E-DCH transmission and reception procedure, a Radio Network Controller (RNC) additionally notifies the UE 201 of autonomous transmission power (or equivalent rate) for each logical channel through the Node B 200 at an E-DCH setup in step 202. In step 208, the AG or RG being the scheduling assignment information may or may not include autonomous transmission power. A Node B as referred to throughout the disclosure may be any base station; a base station may be any base station for conducting wireless communication with a user equipment including but not limited to a Node B, base station, BTS and an access point.

Step 210 will be described below in great detail, following a description of the configuration of a UE supporting E-DCH transmission brief with reference to FIG. 3. A user equipment (UE) as referred to throughout the disclosure can be any user equipment for conducting wireless communication including but not limited to a mobile telephone, computer and PDA.

Figure 3:
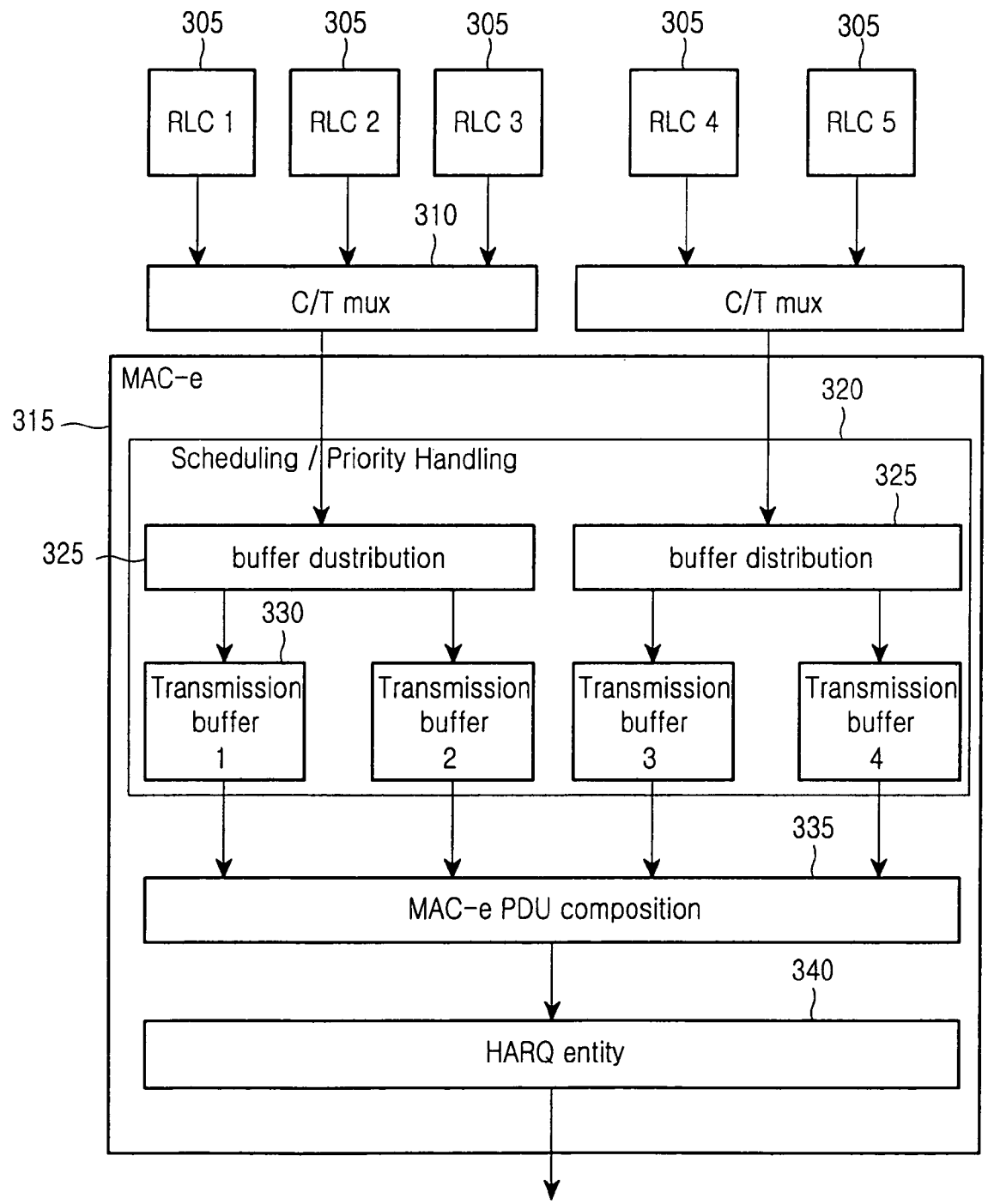
FIG. 3 is a block diagram of a UE supporting the E-DCH according to a preferred embodiment of the present invention.

FIG. 3 is a block diagram of a UE supporting the E-DCH according to a preferred embodiment of the present invention.

Referring to FIG. 3, the UE includes Radio Link Control (RLC) entities 305, Control/Traffic multiplex (C/T mux) entities 310 for inserting multiplexing information in data received from the RLC entities 305, and a Medium Access Control (MAC) entity 315.

Each of the RLC entities 305 is configured for a logical channel or a radio bearer. The RLC entities 305 store data generated in an upper layer and construct the data to a size suitable for transmission in a radio layer. A radio bearer refers to RLC entities 305 configured to process data from a particular application and the upper layer, and a logical channel is configured between a particular RLC entity and a MAC layer.

The C/T mux entities 310 insert multiplexing information in the data received from the RLC entities 305. The multiplexing information can be the identifier (ID) of a logical channel. A receiver transfers received data to an appropriate RLC entity 305 based on a logical channel ID set in the data. The C/T mux entities 310 are called a MAC-d layer and the output of each C/T mux entity 310 is called a MAC-d flow. Since E-DCH data is transferred from the MAC-d layer, it is called MAC-d Protocol Data Units (PDUs).

An example of the MAC-e layer 315 will be described below.

A scheduling/priority handler 320 schedules data to be transmitted in the next TTI, taking into account the priority levels of logical channels mapped to the E-DCH.

Transmission buffers 330 in the scheduling/priority handler 320 buffer the data received from the C/T mux entities 310 through buffer distributors 325 according to their priority levels or MAC-d flows, prior to transmission.

The logical channels are prioritized and each of the transmission buffers 330 buffers the data of logical channels with the same priority or the data of logical channels included in the same MAC-d flow.

MAC-d flows are classified according to the Quality of Service (QoS) levels of logical channels. Logical channels having the same QoS requirement are classified into the same MAC-d flow. The MAC-e layer 315 can provide differentiated QoS for each MAC-d flow. The QoS is adjusted by, for example, the number of HARQ retransmissions or transmit power.

The transmission buffer 330 functions to buffer data until transmission. As described before, the RLC entities 305 are also provided with buffers which can serve as the transmission buffers 330. The transmission buffers 330 in the MAC-e configuration can be implemented in the following three ways:

1. according to priority levels;
2. according to MAC-d flows; and
3. using RLC buffers, which obviates the need for separately procured transmission buffers in the MAC-e layer.

None of the above three ways affects the present invention and thus a transmission buffer is configured in one of the three ways in the present invention.

The buffer distributors 325 transfer data received from the C/T mux entities 310 to appropriate transmission buffers. They may exist if the MAC-e layer 315 has the transmission buffers.

A MAC-e PDU composer 335 selects an E-TFC for use in autonomous transmission and scheduled transmission of the E_DCH and constructs MAC-e PDUs with data received from the transmission buffers 330 according to the selected E-TFC. The MAC-e PDUs are packets to be transmitted on a radio channel. Each of the MAC-e PDUs is comprised of a header and payload and data buffered in the transmission buffers 330 are filled in the payload.

An HARQ entity 340 controls HARQ transmission and retransmission.

As described earlier, the UE buffers MAC-d PDUs to be transmitted on the E-DCH in the transmission buffers 330 and requests assignment of transmission resources to the Node B. When being assigned the transmission resources from the Node B, the UE transmits MAC-e PDUs according to the assigned transmission resources.

However, it may not be preferred to request scheduling and then carry out transmission for delay-sensitive data or important data. For example, if the UE transmits a Radio Resource Control (RRC) message after assignment of transmission resources from the Node B, excess delay may occur because it is preferable to transmit the RRC message as soon as generated. Autonomous transmission of such delay-sensitive or important data is under consideration. Considering that the autonomous transmission does not require permission from the Node B, it is preferable to minimize a data range for which the autonomous transmission is available. For example, important and delay-sensitive data such as an RRC message rather than delay-insensitive data like File Transfer Protocol (FTP) data is to be autonomously transmitted.

Autonomous transmission may be available all the time for autonomous transmission data with a data rate or transmit power at or below a predetermined level, and the data rate or transmit power of autonomous transmission data may be restricted in order to maintain the efficiency of the Node B-controlled scheduling. Accordingly, the present invention provides a method of efficiently distributing transmit power for autonomous transmission of the E-DCH to individual UEs within a restricted total power.

Figure 4:
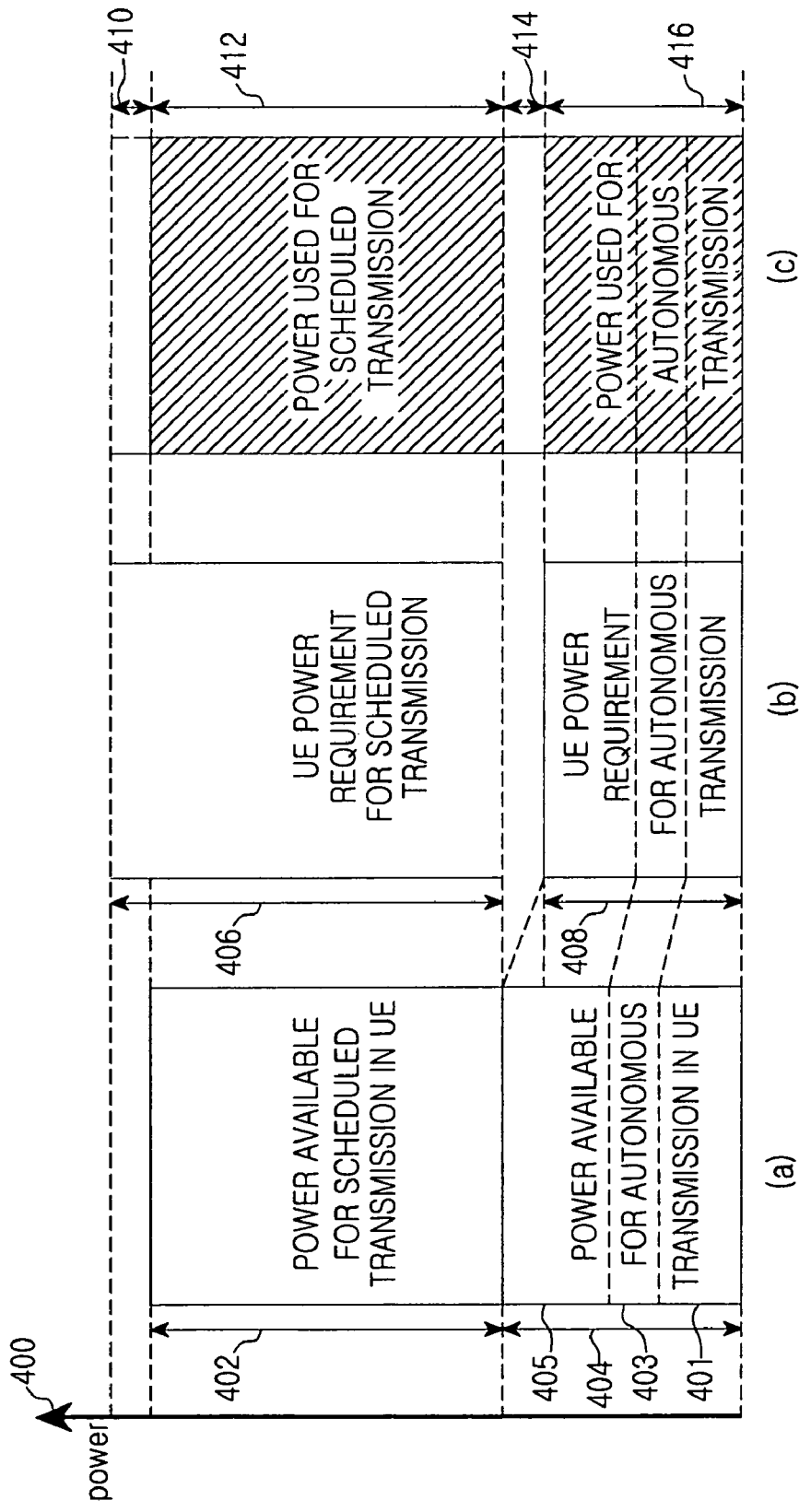
FIG. 4 illustrates an E-TFC selecting operation according to a preferred embodiment of the present invention.

With reference to FIG. 4, a power allocation method according to a preferred embodiment of the present invention will be described.

Referring to FIG. 4, a vertical axis 400 denotes power level. The power level increases as the arrow goes up. Reference character (a) denotes power available for E-DCH data transmission, divided into maximum allowed power 402 for data transmission based on Node B-controlled scheduling (hereinafter, referred to as scheduled transmission) and allowed power 404 for autonomous transmission. The allowed autonomous transmission power 404 is the sum of power levels (or equivalent data rates) available to respective logical channels when an RNC establishes an E-DCH. For example, the sum of power levels that can be assigned to logical channels 401, 403 and 405 (logical #1, logical channel #2 and logical channel #3) is the allowed autonomous transmission power 404. The allowed scheduled transmission power 402 is the smaller between (the E-DCH data transmission power 402-the autonomous transmission power 404) and scheduled power assigned by the Node B-controlled scheduling. The allowed autonomous transmission power 404 is limited to a predetermined level to maintain the efficiency of the Node B-controlled scheduling and autonomous transmission is ensured for autonomous transmission data generated from the UE at or below the predetermined power level.

Reference character (b) denotes total power that the UE needs for the E-DCH data transmission, including power 406 required for scheduled transmission and total power 408 required the autonomous transmission. Compared to (a), the power requirement 406 for scheduled transmission is higher than the allowed power 402 for scheduled transmission. The power requirement 408 for autonomous transmission is lower than the allowed power 404 for autonomous transmission. That is, the power 408 required for autonomous transmission of the respective logical channels is lower than the maximum allowed autonomous transmission power 404.

Reference character (c) denotes an example of actual E-DCH transmission power assigned by the UE, taking into account the maximum allowed E-DCH transmission power and the E-DCH transmission power requirement. Since autonomous transmission data has a higher priority level, the UE first assigns autonomous transmission power 416 and then scheduled transmission power 412. Because the total autonomous transmission power requirement 408 is lower than the maximum allowed autonomous transmission power 404, the UE transmits the autonomous transmission data with the power 416, resulting in the difference 414 between the power 408 and the power 416 as a power margin.

The assignment of the scheduled transmission power 412 follows that of the autonomous transmission power 416. Since the scheduled transmission power requirement 406 is higher than the allowed scheduled transmission power 402, the power 402 becomes the actual assigned scheduling transmission power 412. Although power as much as the difference 410 between the power 406 and the power 412 is needed for scheduled transmission, the power margin 414 resulting from the autonomous transmission cannot be used for the scheduled transmission. Therefore, the total power used for the E-DCH transmission from the UE is the sum of the powers 416 and 412 marked with slash lines.

In summary, even though the power margin 414 results from power assignment for autonomous transmission, it cannot be used for scheduled transmission. Therefore, unexpected data transmission from the UE is prevented for the Node B. If a particular UE does not use all of its assigned autonomous transmission rates, another UE can use the extra uplink RoT resources. This statistical multiplexing effect minimizes uplink RoT resources that must be reserved for autonomous transmission but maximizes RoT resources for Node B-controlled scheduling. Hence, scheduling efficiency is increased. The statistical multiplexing effect can be estimated according to the statistical data transmission frequency of each logical channel.

Selection of transmit power taking into account autonomous transmission can be carried out in the following manner according to the present invention. Power, that is, a data rate selected by the UE is set as a TFC.

Embodiment 1

Figure 5:
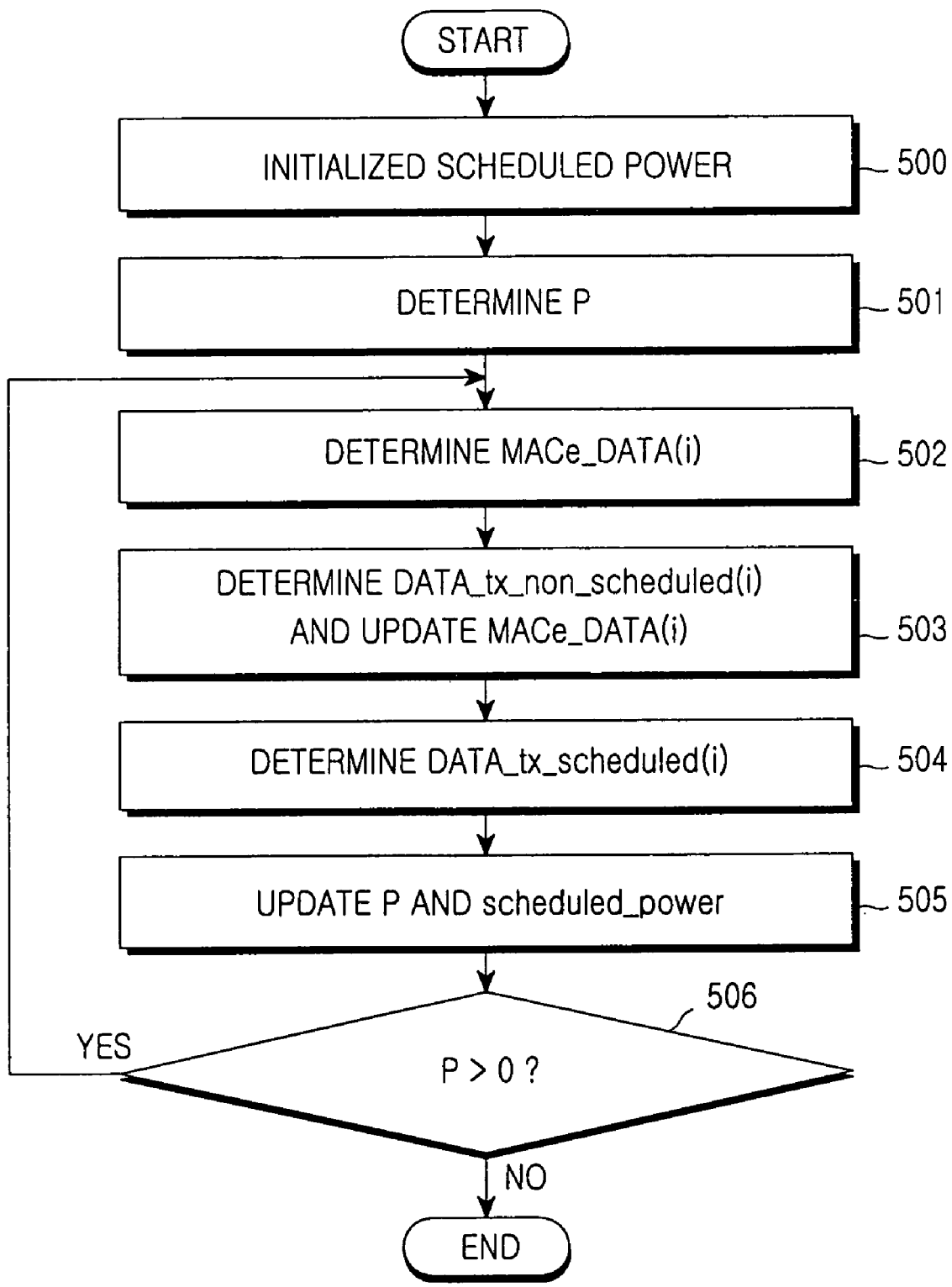
FIG. 5 is a flowchart illustrating the E-TFC selecting operation taking autonomous transmission into account according to the preferred embodiment of the present invention.

In the case where a value of a scheduling grant such as an AG or an RG transmitted from the Node B does not include autonomous transmission power, an E-TFC is selected in the procedure of FIG. 5.

FIG. 5 is a flowchart illustrating an E-TFC selecting operation taking autonomous transmission into account according to the preferred embodiment of the present invention.

Referring to FIG. 5, the UE determines a scheduled power level from a scheduling grant (AG or RG) in an initial stage for E-TFC selection in step 500 by $$\text{scheduled\_power} = \text{AG\_RG\_from\_scheduler} \qquad (1)$$

In step 501, the UE determines a power level P available for E-DCH data transmission after assigning power to a DCH and other control channels within maximum allowed power.

The UE determines the amount of data (called MACe_DATA(i)) to be loaded in a MAC-e PDU among remaining data to be transmitted using the power P according to the power offset (POi) of a logical channel i with the highest priority in step 502.

$$\text{MACe\_DATA}(i) = f_i(P) \qquad (2)$$

where $f_i$ is a function of P for calculating the amount of MAC-e data considering the power offset of the logical channel i.

In step 503, the amount of autonomous transmission data (called DATA_tx_non_scheduled(i)) to be loaded in the MAC-e PDU is the minimum of the amount of the total available autonomous transmission data for the logical channel (available_autonomous data(i)), the maximum amount of autonomous transmission data allowed to be transmitted on the logical channel and corresponding to an allowed autonomous transmission power for the logical channel, and MACe_DATA(i). The RNC notifies the UE of an autonomous transmission power level (autonomous_data(i)) for each logical channel at an E-DCH setup. Step 503 can be expressed as $$\text{DATA\_tx\_non\_scheduled}(i) = \text{MIN}(\text{available\_autonomous\_data}(i), \text{autonomous\_data}(i), \text{MACe\_DATA}(i)) \qquad (3)$$

Later, the amount of data that can be loaded in the MAC-e PDU is updated by taking into account the amount of the actually loaded data. Thus, $$\text{MACe\_DATA}(i) = \text{MACe\_DATA}(i) \_ \text{DATA\_tx\_non\_scheduled}(i) \qquad (4)$$

In step 504, the UE determines the amount of scheduling transmission data (DATA_tx_scheduled(i)) to be loaded in the MAC-e PDU. DATA_tx_scheduled(i) is the minimum of the amount of the total available scheduled transmission data for the for the logical channel (available_scheduled_data(i)), scheduled_data(i), and MACe_DATA(i). The scheduled_data is the maximum amount of scheduled transmission data allowed to be transmitted by using allowed scheduled_power according to the power offset POi of the logical channel i, expressed as $$\text{scheduled\_data}(i) = f_i(\text{scheduled\_power}) \qquad (5)$$

Step 504 is represented as $$\text{DATA\_tx\_scheduled}(i) = \text{MIN}(\text{available\_scheduled\_data}(i), \text{scheduled\_data}(i), \text{MACe\_DATA}(i)) \qquad (6)$$

After determining the power for data transmission on the logical channel i according to DATA_tx_non_scheduled(i), DATA_tx_scheduled(i), and the power offset POi, power P available for a logical channel with the second highest priority is calculated by subtracting the determined power from the power P available for the E-DCH data transmission.

$$P = P - g(\text{DATA\_tx\_non\_scheduled}(i), \text{DATA\_tx\_scheduled}(i), \text{POi}) \qquad (7)$$

scheduled_power available for the logical channel with the second highest priority is updated by calculating power using DATA_tx_scheduled(i) according to $$\text{scheduled\_power} = \text{scheduled\_power} - f_i^{-1}(\text{DATA\_tx\_scheduled}(i)) \qquad (8)$$

If the available power P is greater than 0 in step 506, steps 502 to 506 are repeated for the logical channel with the highest priority. If P is equal to or less than 0, the transmit power selection procedure ends.

As described above, power levels are selected for logical channels and set as a corresponding TFC among predetermined TFCs. The UE then transmits E-DCH data using the TFC. As to the structure for performing the steps in FIG. 5, the MAC-e PDU composer 335 in FIG. 3 may perform all of the steps including the steps 500-506.

According to another exemplary embodiment of the invention, in step 503, the amount of autonomous transmission data (called DATA_tx_non_scheduled(i)) to be loaded in the MAC-e PDU can be the minimum of the amount of data for the logical channel (available data(i)), the maximum amount of autonomous transmission data allowed to be transmitted on the logical channel and corresponding to an allowed autonomous transmission power for the logical channel, and MACe_DATA(i). Where the available data(i) includes both the autonomous transmission data and scheduled data.

In other words, when the DATA_tx_non_scheduled(i) is determined in step 503, the autonomous transmission data and scheduled data are not considered individually and are treated the same for the purpose of loading, without giving priority to any one of the two types of data, the MAC-e-PDU in step 503.

Subsequently, in step 504, the UE determines the amount of scheduling transmission data (DATA_tx_scheduled(i)) to be loaded in the MAC-e PDU. DATA_tx_scheduled(i) is the minimum of remaining data available for the logical channel (remaining_available_data(i)), scheduled_data(i), and MACe_DATA(i). The scheduled_data is the maximum amount of scheduled transmission data allowed to be transmitted by using allowed scheduled_power according to the power offset POi of the logical channel i.

Embodiment 2

In the case where a value of a scheduling grant (an AG or an RG) transmitted from the Node B is a sum including autonomous transmission power, an E-TFC is selected in the following way in relation to the procedure of FIG. 5.

Referring to FIG. 5, the UE (via, for example, 335) determines a scheduled power level from a scheduling grant (AG or RG) and the sum of autonomous_power for respective logical channels in an initial stage for E-TFC selection in step 500 by $$scheduled\_power = AG\_RG\_from\_scheduler - sum\_of\_autonomous\_power \quad (9)$$

where sum_of_autonomous_power is the sum of the autonomous_power of logical channels included in the scheduling grant.

Steps 501 to 506 are subsequently performed in the same manner as in the first embodiment of the present invention. Further, Steps 503 and 504 can be performed according to the another exemplary embodiment of the invention described above in relation to Steps 503 and 504 where the autonomous transmission data and scheduled data are not considered individually and are treated the same for the purpose of loading the MAC-e-PDU in steps 503 and 504.

As described above, advantageous effects of the present invention are found as follows.

According to the present invention, a power margin resulting from assigning power to logical channels for autonomous transmission within an allowed autonomous transmission power is prevented from being used for scheduled transmission in selecting an E-TFC when an E-DCH is used. Therefore, unexpected data transmission from a UE is prevented for a Node B, thereby increasing scheduling efficiency.

If a particular UE does not use up its assigned autonomous transmission rate, another UE can use the extra uplink RoT resources. This statistical multiplexing effect minimizes uplink RoT resources that must be reserved for autonomous transmission but maximizes RoT resources for Node B-controlled scheduling. Hence, scheduling efficiency is increased.

While the invention has been shown and described with reference to certain preferred embodiments thereof, it will be understood by those skilled in the art that various changes in form and details may be made therein without departing from the spirit and scope of the invention as defined by the appended claims. While the E-DCH and CDMA communication systems were discussed in detail above, the present invention is also applicable to any other communication systems including but not limited to OFDMA and TDMA systems.

What is claimed is:

1. A method for determining data amounts for scheduled and autonomous transmission, the method comprising:
   receiving, by a user equipment (UE), information related to an allowed power for autonomous transmission on at least one logical channel mapped to an uplink channel, the uplink channel being set up with a base station and dedicated for packet data transmission;
   determining, by the UE, in accordance with a scheduling grant received from the base station, an allowed power of scheduled transmission on the uplink channel;
   determining, according to a total power available for the uplink channel, a total data amount allowed to be transmitted;
   determining a data amount for the autonomous transmission on the logical channel, the determined autonomous transmission data amount being a smaller value between an allowed autonomous transmission data amount corresponding to the allowed autonomous transmission power and an autonomous transmission data amount corresponding to a required autonomous transmission power;
   subtracting from the total data amount allowed to be transmitted on the logical channel the determined autonomous transmission data amount after determining the autonomous transmission data amount on the logical channel;
   updating the total data amount allowed to be transmitted on the logical channel with the subtraction result; and
   determining a data amount for scheduled transmission on the logical channel, the determined scheduled transmission data amount being a smaller value between an allowed scheduled transmission data amount corresponding to the allowed scheduled transmission power and a scheduled transmission data amount corresponding to a required scheduled transmission power,
   wherein the data amount for scheduled transmission is determined, after the data amount for the autonomous transmission is determined, and
   wherein the determined scheduled transmission data amount is limited to be no greater than the updated total data amount allowed to be transmitted on the logical channel.

2. The method of claim 1, wherein the logical channel is a logical channel with the highest priority among a plurality of logical channels mapped to the uplink channel.

3. The method of claim 2, further comprising determining the allowed scheduled transmission power includes using a sum of allowed autonomous transmission powers for the plurality of logical channels.

4. The method of claim 1, wherein the total data amount allowed to be transmitted on the logical channel is determined based on a power offset of the logical channel.

5. The method of claim 1, further comprising:
subtracting from the allowed scheduled transmission power equivalent to the determined data amount for the scheduled transmission; and
updating the allowed scheduled transmission power with the subtraction result.

6. The method of claim 1, further comprising:
subtracting from the total power available for the uplink channel power for data transmission on the logical channel; and
updating the total power available for the uplink channel with the subtraction result.

7. The method of claim 6, further comprising:
determining for a second logical channel a data amount for autonomous transmission when the updated total power available for the uplink channel is greater than zero;
subtracting the determined autonomous transmission data amount from a total data amount allowed to be transmitted on the second logical channel; and
updating the total data amount allowed to be transmitted on the second logical channel with the second subtraction result.

8. The method of claim 6, further comprising:
subtracting from the updated total power available for the uplink channel power for data transmission on a second logical channel; and
updating the total power available for the uplink channel with the second subtraction result.

9. A user equipment (UE) comprising:
at least one buffer to store data of at least one logical channel mapped to an uplink channel; and
a data composer coupled to the buffer and adapted to:
receive information related to an allowed power for autonomous transmission on at least one logical channel mapped to an uplink channel, the uplink channel being set up with a base station and dedicated for packet data transmission;
determine, in accordance with a scheduling grant received from the base station, an allowed power of scheduled transmission on the uplink channel;
determine, according to a total power available for the uplink channel, a total data amount allowed to be transmitted;
determine a data amount for the autonomous transmission on the logical channel, the determined autonomous transmission data amount being a smaller value between an allowed autonomous transmission data amount corresponding to the allowed autonomous transmission power and an autonomous transmission data amount corresponding to a required autonomous transmission power;
subtract from the total data amount allowed to be transmitted on the logical channel the determined autonomous transmission data amount after the autonomous transmission data amount on the logical channel is determined;
update the total data amount allowed to be transmitted on the logical channel with the subtraction result; and
determine a data amount for scheduled transmission on the logical channel, the determined scheduled transmission data amount being a smaller value between an allowed scheduled transmission data amount corresponding to the allowed scheduled transmission power and a scheduled transmission data amount corresponding to a required scheduled transmission power,
wherein the data amount for scheduled transmission is determined, after the data amount for the autonomous transmission is determined, and
the determined scheduled transmission data amount is limited to be no greater than the updated total data amount allowed to be transmitted on the logical channel.

10. The user equipment of claim 9, wherein the logical channel is a logical channel with the highest priority among a plurality of logical channels mapped to the uplink channel.

11. The user equipment of claim 10, wherein the data composer is further adapted to determine the allowed scheduled transmission power by using a sum of allowed autonomous transmission powers for the plurality of logical channels.

12. The user equipment of claim 9, wherein the data composer is adapted to determine the total data amount allowed to be transmitted on the logical channel based on a power offset of the logical channel.

13. The user equipment of claim 9, wherein the data composer is adapted to:
subtract from the allowed scheduled transmission power equivalent to the determined data amount for the scheduled transmission; and
update the allowed scheduled transmission power with the subtraction result.

14. The user equipment of claim 9, wherein the data composer is adapted to:
subtract from the total power available for the uplink channel power for data transmission on the logical channel; and
update the total power available for the uplink channel with the subtraction result.

15. The user equipment of claim 14, wherein the data composer is adapted to:
determine for a second logical channel a data amount for autonomous transmission when the updated total power available for the uplink channel is greater than zero;
subtract the determined autonomous transmission data amount from a total data amount allowed to be transmitted on the second logical channel; and
update a total data amount allowed to be transmitted on the second logical channel with the second subtraction result.

16. The user equipment of claim 14, wherein the data composer is adapted to:
subtract from the updated total power available for the uplink channel power for data transmission on a second logical channel; and
update the total power available for the uplink channel with the second subtraction result.

* * * * *